United States Patent
Yagoub et al.

(10) Patent No.: US 10,218,591 B2
(45) Date of Patent: Feb. 26, 2019

(54) EMBEDDED PERFORMANCE MONITORING OF A DBMS

(71) Applicant: Oracle International Corporation, Redwood Shores, CA (US)

(72) Inventors: Khaled Yagoub, Newark, CA (US); Cecilia Gervasio Grant, Belmont, CA (US); Yuan Xie, Foster City, CA (US); Jinye Huo, Redwood City, CA (US); Benoit Dageville, Truckee, CA (US); Abdul Munir, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 668 days.

(21) Appl. No.: 14/312,582

(22) Filed: Jun. 23, 2014

(65) Prior Publication Data
US 2015/0372892 A1    Dec. 24, 2015

(51) Int. Cl.
  *G06F 15/173*    (2006.01)
  *H04L 12/26*    (2006.01)
  *H04L 29/08*    (2006.01)
  *G06F 17/30*    (2006.01)

(52) U.S. Cl.
  CPC ........ *H04L 43/08* (2013.01); *G06F 17/30306* (2013.01); *H04L 67/025* (2013.01)

(58) Field of Classification Search
  CPC ....... H04L 43/08; H04L 67/025; G06F 17/30; G06F 17/30306
  USPC .................................................. 709/223–224
  See application file for complete search history.

(56) References Cited

U.S. PATENT DOCUMENTS

| | | | | |
|---|---|---|---|---|
| 5,905,868 A | * | 5/1999 | Baghai ................ | G06F 11/3495 709/224 |
| 6,950,822 B1 | | 9/2005 | Idicula et al. | |
| 7,320,004 B1 | * | 1/2008 | DeLuca ................ | H04L 43/067 709/223 |
| 8,639,802 B2 | * | 1/2014 | Zhou .................... | H04L 43/045 709/224 |
| 9,087,052 B2 | | 7/2015 | Mccall et al. | |
| 9,122,644 B2 | | 9/2015 | Kruglikov et al. | |
| 9,262,295 B2 | * | 2/2016 | Coley ................. | G06F 11/3409 |
| 9,396,220 B2 | | 7/2016 | Li et al. | |
| 9,524,322 B2 | | 12/2016 | Yagoub et al. | |
| 9,705,772 B2 | * | 7/2017 | Masuda .............. | H04L 43/0876 |
| 2010/0017415 A1 | * | 1/2010 | Kurumai ............... | H04L 63/104 707/E17.005 |
| 2010/0211629 A1 | * | 8/2010 | Ok ........................ | H04L 41/044 709/223 |
| 2015/0358391 A1 | * | 12/2015 | Moon .................... | H04L 67/10 709/224 |

* cited by examiner

*Primary Examiner* — Bharat Barot
(74) *Attorney, Agent, or Firm* — Hickman Palermo Becker Bingham LLP

(57) ABSTRACT

Embedded Performance Monitoring is an "out-of-box" approach for performance monitoring of a DBMS. Performance monitoring of a DBMS is achieved through use of a browser to access the DBMS once a DBMS is installed and configured. The approach exploits a DBMS configured with the native capability to provide performance monitoring data and software via a browser. To retrieve and use the performance monitoring data from the DBMS, a browser executes software downloaded to the browser from the DBMS using web-based technologies.

21 Claims, 4 Drawing Sheets

EMBEDDED PERFORMANCE MONITORING OF A DBMS

CROSS-REFERENCE TO RELATED APPLICATIONS

Field of the Invention

The present invention relates to monitoring performance in a DBMS (Database Management System).

Background

Performance Monitoring Systems are being used to centrally monitor performance of DBMS's. An approach to implementing a Performance Monitoring System is the distributed-agent approach.

Under the distributed-agent approach, a monitoring client is connected over a network to monitoring agents hosted on the database servers of a DBMS. Each monitoring agent monitors performance of a respective database server of the DBMS and generates performance monitoring data recording the performance of the respective database server. A monitoring agent runs on the same computing device on which the database server being monitored by the monitoring agent runs. A computing device on which a database server runs includes, without limitation, a work station in a cluster of work stations, a personal computer, or a server blade in a grid of server blades. A computing device on which a database server runs is referred to herein as a database server host.

Each monitoring agent in a DBMS transmits performance monitoring data generated to the monitoring client. The monitoring client collects the performance monitoring data transmitted from each of the monitoring agents and uses the collected performance monitoring data to generate performance information to users of a Performance Monitoring System.

According to the distributed-agent approach, each monitoring agent is an application running on the database server host of the database server being monitored by the monitoring agent. The monitoring agent interacts with a database server through a dedicated session on the database server. The monitoring agent may create tables and other types of database objects to store performance monitoring data generated by the monitoring agent.

While the distributed-agent enables performance monitoring of a DBMS, there is overhead associated with this approach. Because a monitoring agent is a separate application that runs on the database server host of a database server, the monitoring agent is installed and maintained separately from the database server.

Furthermore, resources of the database server host and the database server are expended to host the monitoring agent. At least one additional process on the database server host in needed to run the monitoring agent. The session in the database server that is dedicated to a monitoring agent may require an additional process. Storage is expended to store data in database objects created and used by the monitoring agent. The overhead attendant a monitoring agent is compounded by the number of database servers within a DBMS.

Described hereafter are approaches for a Performance Monitoring System that avoid the overhead attendant to such approaches as the distributed-agent approach.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purpose of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein is an approach to performance monitoring of DBMS's that works "out-of-the-box". The approach is referred to herein as Embedded Performance Monitoring. Embedded Performance Monitoring is an "out-of-box" approach because once a DBMS is installed and configured, performance monitoring is simply achieved by using a browser to connect to the DBMS to retrieve performance monitoring data and to render performance information derived from the performance monitoring data.

The approach exploits a DBMS configured with the native capability to provide performance monitoring data and software via a browser. The need for installing and running of another application to monitor performance of a DBMS is eliminated. To retrieve and use the performance monitoring data from the DBMS, a browser executes software downloaded to the browser from the DBMS using web-based technologies.

DBMS Performance Monitoring System

Figure 1:
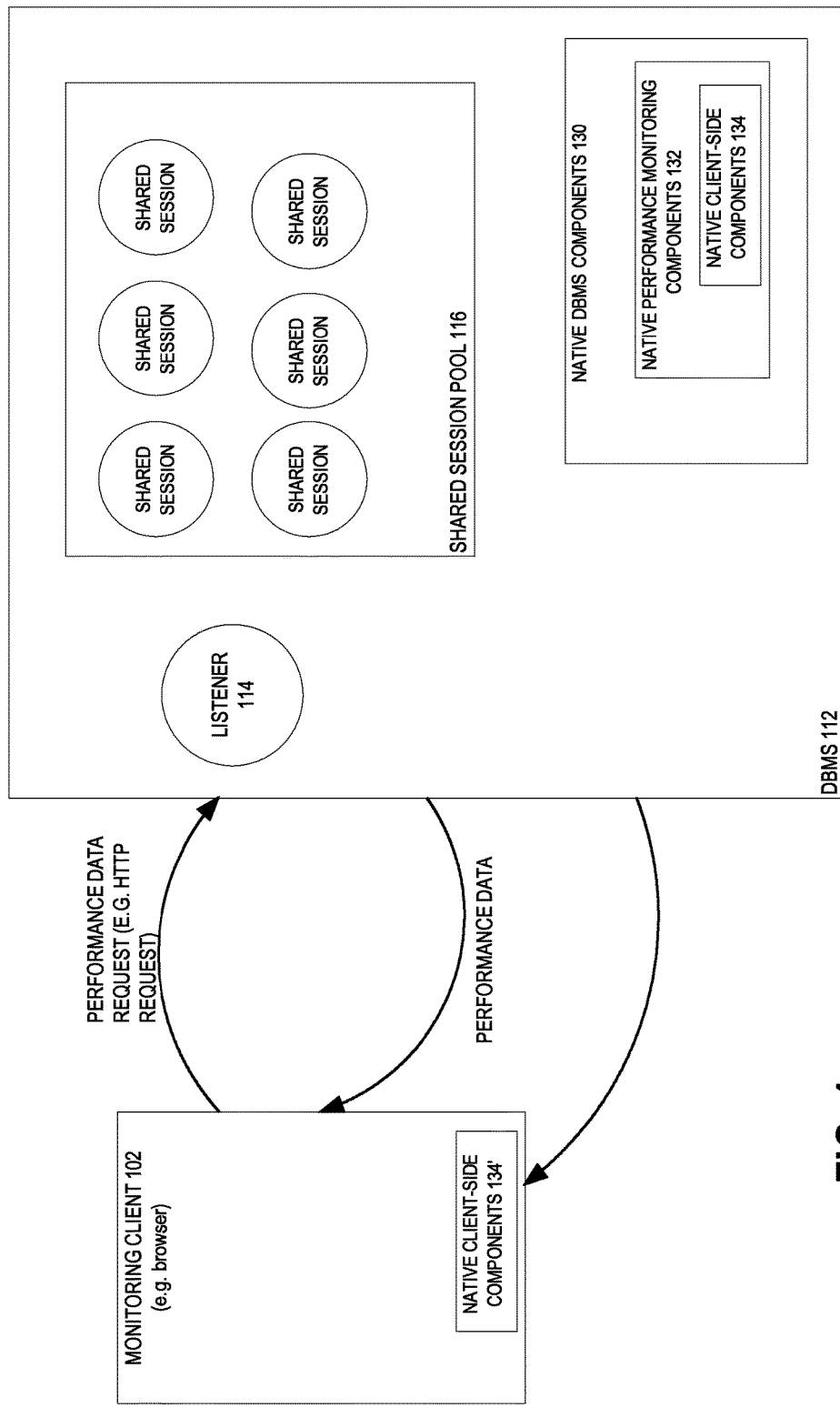
FIG. 1 is a diagram depicting a performance monitoring system according to an embodiment of the present invention.

FIG. 1 depicts an Embedded Performance Monitoring System according to an embodiment of the present invention. Referring to FIG. 1, Embedded Performance Monitoring System comprises a monitoring client 102 connected via a network (not shown) to DBMS 112. DBMS 112 comprises one or more database servers managing access to one or more databases. The network may be a wide area network, including the Internet, or an Intranet, or may only comprise a local area network.

Monitoring client 102 comprises a browser running on a computing device (e.g. personal computer, smart phone, work station) that can connect to DBMS 112 using Internet based communication protocols supported by readily available and commonly used browsers. Examples of such protocols include, without limitation, Hypertext Transfer Protocol ("HTTP") or Secure Hypertext Transfer Protocol ("HTTPS"), which is a form of HTTP providing security capabilities. Examples of readily available and commonly used browsers include, without limitation, Internet Explorer™, Safari™, and Chrome™.

Monitoring client 102 sends performance monitoring data requests to DBMS 112 over the network. Preferably the requests are sent using the HTTPS protocol, thus enabling DBMS 112 to communicate securely with monitoring client 102. Handling performance monitoring data requests may entail authentication that exploits the authentication techniques provided with HTTPS.

In response to performance monitoring data requests, DBMS 112 transmits performance monitoring data to monitoring client 102. Upon receipt of the performance monitoring data, monitoring client 102 generates performance information and renders performance information for viewing and analysis by users.

The capability to respond to performance monitoring data requests in a way described above is a "native capability" of DBMS 112. To explain what is meant by the term "native capability", an explanation of database servers and database server software is useful.

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance". A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

A database client may be an application process. An application process, as the term is used herein, is a process not running under the control of a database server but under control of application software that is not native to a database server. An application process that is a client of a database server may run on the database server host of a database server or on another computing device. Application processes must interact with a database server by establishing a database session with the database server through which to issue requests, which include, without limitation, requests to execute database commands or web-based requests, such as HTTP requests. A monitoring agent under the distributed agent approach is an example of an application process.

Native Database Server Software

Database server software is provided by a database server vendor, such as Oracle™. To run a database server, the database server software is installed on a database server host on which the database server software will run. Database server vendors provide install packages which include machine code and other forms of executable code, configuration data and a baseline database that include a set of database objects needed to run the database server. The package is installed by running one or more installation programs provided in the install packages. The database software, including machine code and others forms of executable software, provided by a database server vendor of the database software is referred to as native database server software or native software.

The capabilities and functions provided by native database server software are referred to as native capabilities or native functions. Native capabilities and functions include the ability to respond to DDL commands to create database objects and to define users that may access a DBMS and its database objects, and to service DML commands to add and modify data stored in a database.

Native Performance Monitoring Components

DBMS 112 includes Native DBMS Components 130, which comprises native software of DBMS 112, that is, the native software of any database servers comprising the DBMS 112. Native DBMS components includes Native Performance Monitoring Components 132. Native Performance Monitoring Components 132 are responsible for collecting, storing, and exposing performance statistics and metrics generated by DBMS 112. Native Performance Monitoring Components 132 include database objects, such as tables that store performance statistics and metrics and views that expose performance statistics and metrics.

Native Client-Side Components 134 are software components that may be downloaded to monitoring client 102 and that are executed by monitoring client 102 to retrieve, render, decompress, and/or otherwise operate upon performance monitoring data generated by DBMS 112, as shall be explained in greater detail. Examples of such Native Client-Side Components 134 include, without limitation, SWF files, available from Adobe™, or components written in JavaScript™ and/or HTML. Native Client-Side Components may be downloaded by DBMS 112 to monitoring client 102 in response to a performance monitoring data request when it is determined that monitoring client 102 does not have Native Client-Side Components (e.g. in response to an initial performance monitoring data request issued by a monitoring client using HTTPS) or has out-of-date Native Client-Side Components.

When monitoring client 102 transmits performance monitoring data requests to DBMS 112, the request is initially received by a listener 114. Listener 114 is a process running under control of DBMS 112 that is responsible for receiving and processing requests to access DBMS 112, and assigning such requests to another process and/or session. Requests to access DBMS 112 include database connections and HTTPS requests.

Listener 114 may receive database connection requests, requesting to establish a database session on DBMS 112. In response, listener 114 may assign a shared session from shared session pool 116. A shared session is a session from a pool of sessions, each of which has been created and initialized to an extent and that may be assigned to multiple database client connection requests. When a shared session is assigned, further initialization may be performed, however such initialize requires much less work than creating a session from "scratch". Creating a session from scratch may entail starting a process on a computer. Example uses for which shared sessions may be advantageous include servicing numerous database connection requests for which only a few database commands are issued during a connection.

When DBMS 112 receives a performance monitoring data request, listener 114 assigns a shared session from shared session pool 116 to service the request. Servicing the performance monitoring data request may entail using native performance capabilities of DBMS 112 to retrieve performance statistics and metrics from which to generate performance monitoring data. For example, within an assigned session, DBMS 112 queries native views of native database objects that store performance statistics and metrics to retrieve performance statistics and metrics, and to generate performance monitoring data to send to monitoring client 102. Generating performance monitoring data may include further computation and aggregation of the performance statistics and metrics.

Using a shared session eliminates the need to run a dedicated session to service performance monitoring data requests. It should be noted that a database session assigned to service the performance monitoring data requests may have previously been or will be used to service a database connection through which to issue database commands.

Embedded Performance Monitoring eliminates the need to run a separate monitoring agent as a separate application process. Much of the overhead attendant to running a separate application process on a database server host of a DBMS is thereby eliminated. Performance monitoring data requests are transmitted by monitoring client 102 to DBMS 112 without participation or need of monitoring agent running as a separate application process.

Packaging Performance Monitoring Data for Transmission

According to an embodiment of the present invention, performance monitoring data is packaged for transmission in ways that minimize work performed by DBMS 112 to prepare the performance monitoring data for transmission and that minimize network bandwidth needed to transport the performance monitoring data.

Specifically, performance monitoring data is compressed before transmission by DBMS 112 to monitoring client 102. The compression reduces the amount of network data that needs to be transmitted over the network by DBMS 112 to communicate performance monitoring data to monitoring client 102.

When received, Native Client-Side Components 134 decompress the received performance monitoring data. Because Native Performance Monitoring Components 132 perform decompression, Native Client-Side Components 134 may be programmed by database server vendors to exploit a large variety of compression techniques to compress performance monitoring data. In another embodiment, the performance monitoring data may be compressed using techniques supported by and inherent to browsers. However, this approach limits the compressing of performance monitoring data to those compression techniques supported by and inherent to browsers.

Performance monitoring data is preferable formatted in a format that is presentation-free, such as XML. An example of a presentation format (i.e. a format that is not presentation free) is HyperText Markup Language (HTML). Use of a presentation-free format not only reduces the amount of network bandwidth needed to transmit performance monitoring data but also the processing work required by DBMS 112 to prepare performance monitoring data for transmission. Instead of DBMS 112 transforming performance monitoring data in a presentation format, the monitoring client 102 transforms performance monitoring data in a presentation format through execution of Native Client-Side Components 134.

Using Embedded Performance Monitoring

Figure 2A:
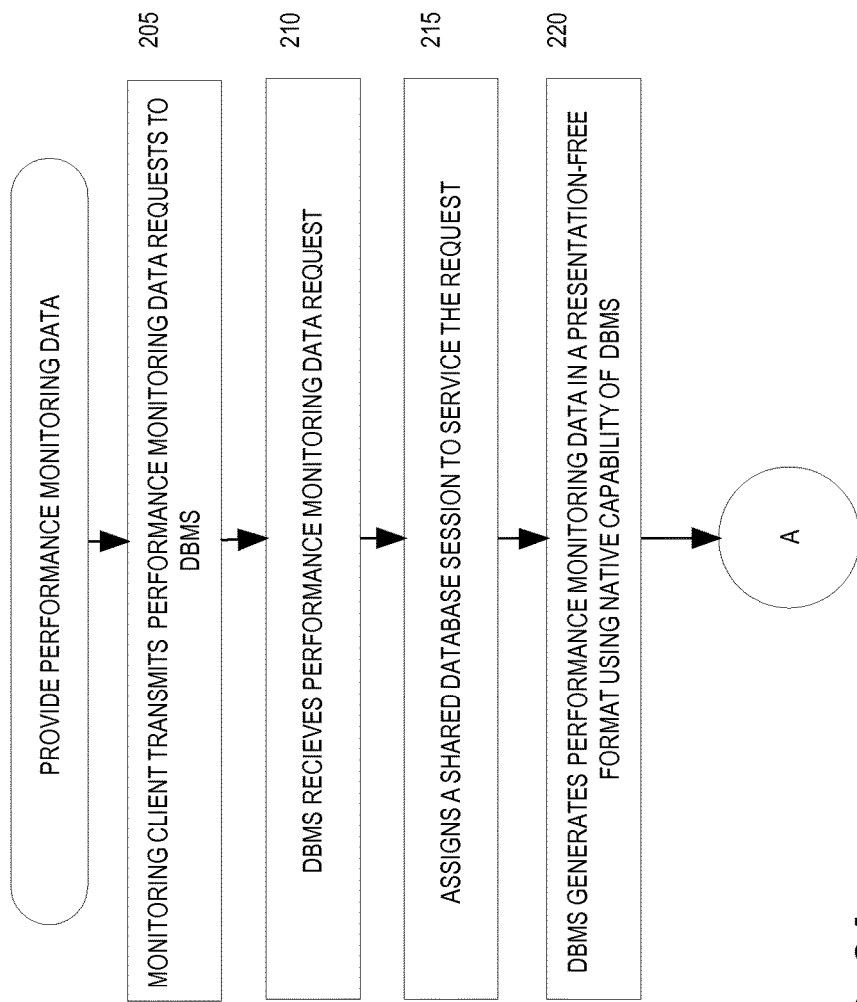
FIG. 2A is a flowchart showing operations performed for providing performance monitoring data according to an embodiment of the present invention.
Figure 2B:
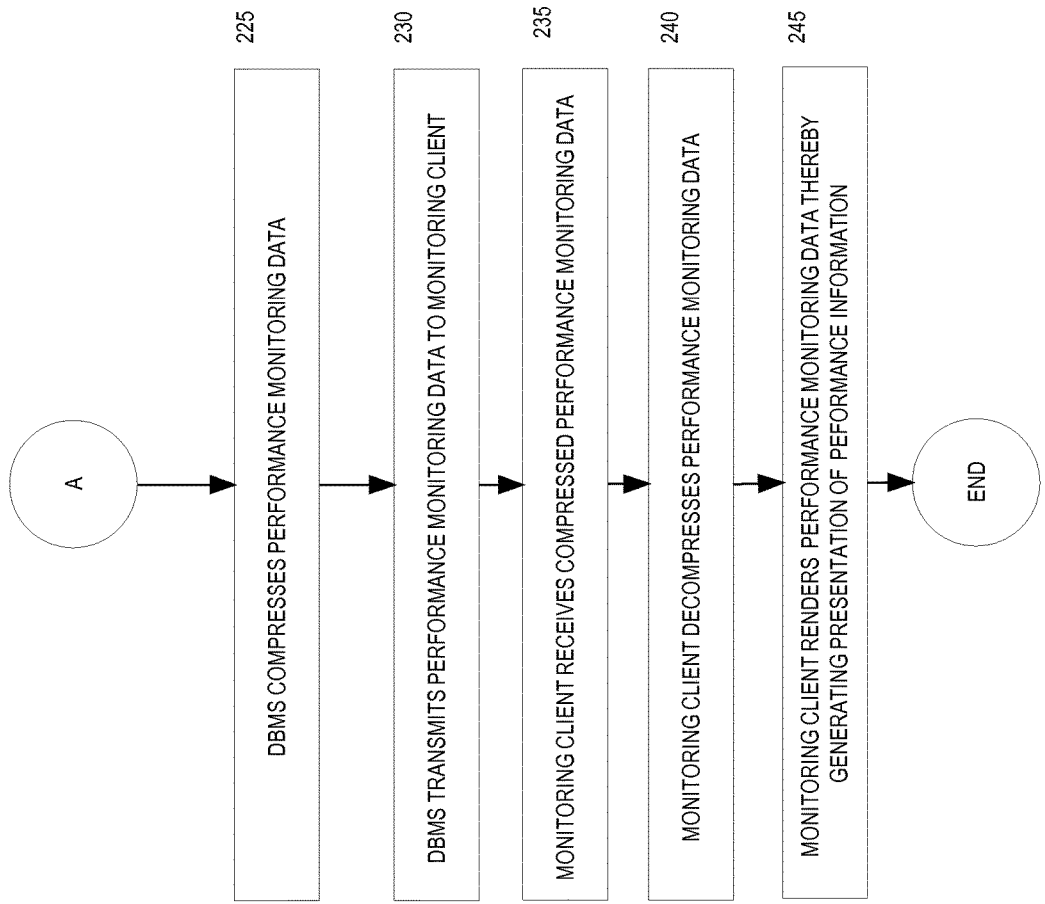
FIG. 2B is a flowchart showing operations performed for providing performance monitoring data according to an embodiment of the present invention.

FIGS. 2A and 2B highlight operations performed by monitoring client 102 and DBMS 112 to provide performance information using Embedded Performance Monitoring capabilities of DBMS 112. The operations described below are performed by DBMS 112 using native capabilities of the DBMS 112.

Referring to FIG. 2A, at 205, monitoring client 102 transmits a performance monitoring data request to DBMS 112. Preferably, the request is transmitted using HTTPS, to exploit the authentication mechanisms inherent to HTTPS. At 210, DBMS 112 receives the performance monitoring data request.

At 215, DBMS 112 assigns a shared session from shared session pool 116 to service the request.

At 220, DBMS 112 generates within the assigned shared session the performance monitoring data. In an embodiment, DBMS 112 queries native views of native database objects that store performance statistics and metrics to retrieve performance statistics and metrics, and generate performance monitoring data to send to monitoring client 102. The performance monitoring data generated is generated in a presentation-free format.

Referring to FIG. 2B, at 225, DBMS 112 compresses the performance monitoring data for transmission to monitoring client 102.

At 230, DBMS 112 transmits performance monitoring data to monitoring client 102. At 235, monitoring client 102 receives the compressed performance monitoring data.

At 240, monitoring client 102 decompresses the performance monitoring data. Such decompression entails execution of Native Client-Side Components 134 to decompress the performance monitoring data.

At 245, monitoring client 102 renders performance monitoring data, thereby generating a presentation of performance information, as further described below.

Performance Information

Performance information may be presented and analyzed from three standpoints: overall system performance, database statements, and database sessions. By execution of Native Client-Side Components 134, monitoring client 102 presents performance information from each standpoint through separate but integrated GUI (Graphical User Interface) applications, which are described below.

Statement Hub: Provides performance information regarding real-time and historical performance of instances of particular database statements. Provides performance information about execution plans for database statements (e.g. statements written in SQL and PL/SQL), and comparison of performance between execution plans. Provides the ability for a user to select a time frame, and limit performance information presented regarding database statements to the selected time frame.

Session Hub: Provides performance information related to one or more database sessions. Both real-time and historical performance information on a database session is presented. A session about which information is presented can be active or terminated. Can be used to quickly identify periods of inactivity or activity for a given session. Provides the ability for a user to select a time frame, and limit performance information presented regarding sessions to the selected time frame.

Performance Hub: Provides consolidated performance information about a DBMS at a system level. Provides the ability for a user to select a time frame, and limit performance information presented regarding a DBMS to the selected time frame.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
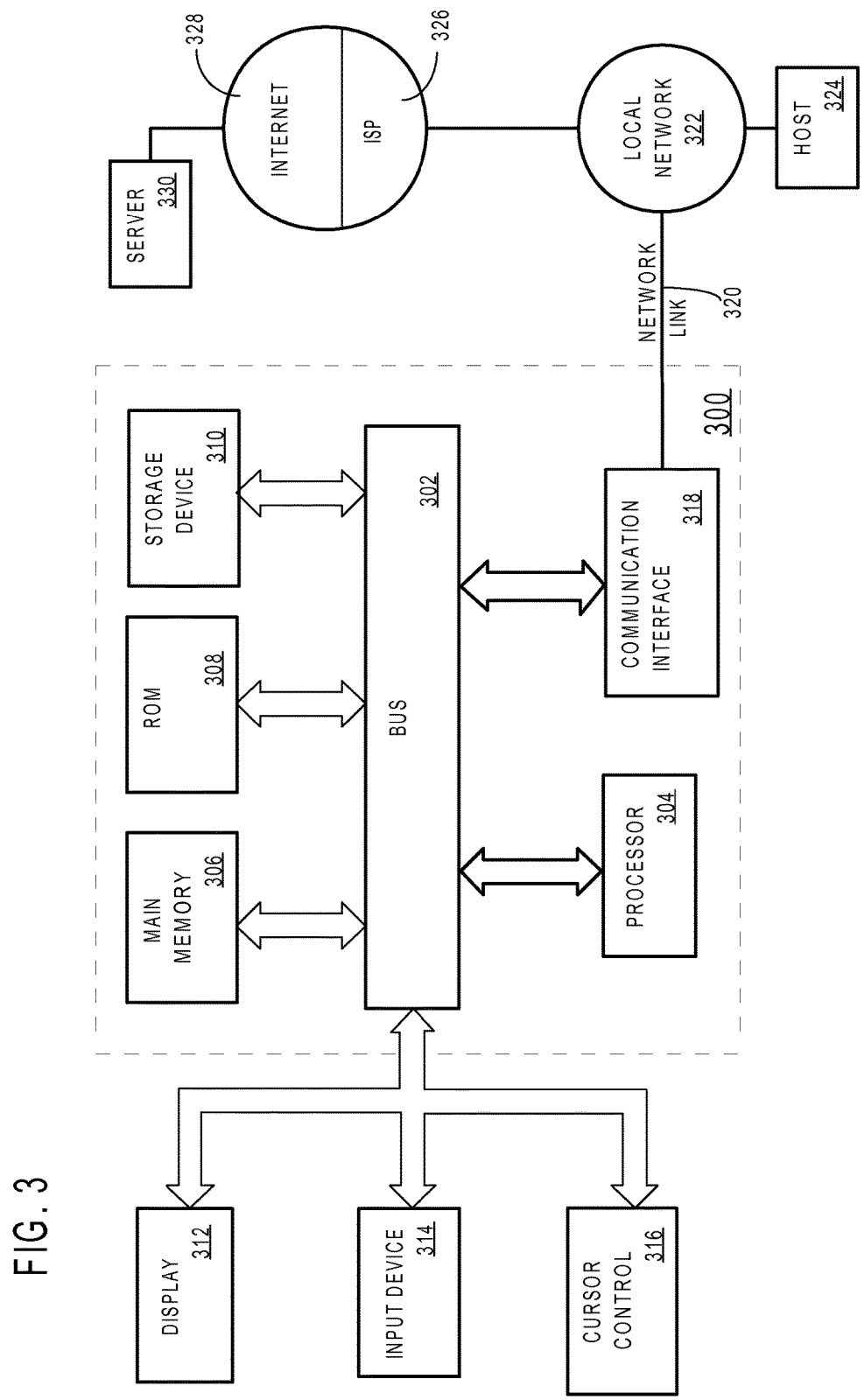
FIG. 3 is a flowchart showing of a computer system upon which an embodiment of the present invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

Cloud Computing Overview

The techniques described herein are implemented using one or more processing solutions, examples of which include distributed systems, clustered computing systems, and cloud computing systems. In an embodiment, DBMS 112 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to DBMS 112, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising steps of:
   a DBMS receiving an HTTP request from a monitoring client for performance monitoring data related to the DBMS; and
   in response to receiving said HTTP request:
      retrieving performance metrics of the DBMS through a shared database session from a shared pool of sessions of the DBMS;
      based at least in part on the performance metrics, said DBMS generating said performance monitoring data that includes: performance information regarding one or more database statements executed by said DBMS, performance information regarding overall system performance of said DBMS, or performance information regarding one or more database sessions of said DBMS; and
      said DBMS transmitting said performance monitoring data to said monitoring client.

2. The method of claim 1, further comprising:
   in response to receiving said HTTP request, assigning the shared database session from the shared pool of sessions through which to retrieve the performance metrics from native components of the DBMS.

3. The method of claim 1, wherein generating said performance monitoring data includes generating said performance monitoring data in a presentation-free format.

4. The method of claim 1, further comprising:
   said DBMS downloading native client-side components to said monitoring client, said native client-side components being configured to decompress data compressed by said DBMS; and
   in response to receiving said HTTP request:
      said DBMS compressing said performance monitoring data.

5. The method of claim 4, wherein said DBMS downloading native client-side components is performed in response to receiving said HTTP request.

6. The method of claim 1, wherein generating said performance monitoring data includes generating said performance monitoring data in a presentation-free format, further comprising:
   said DBMS downloading native client-side components to said monitoring client, said native client-side components being configured to generate a presentation of particular performance information based on said performance monitoring data.

7. The method of claim 6, wherein said DBMS downloading the native client-side components is performed in response to receiving said HTTP request.

8. The method of claim 6, wherein the native client-side components are configured to cause a browser to display the particular information about at least one of:
 the performance information regarding the one or more database sessions of said DBMS,
 the performance information regarding the one or more database statements executed by said DBMS, and
 the performance information regarding overall system performance of said DBMS.

9. The method of claim 1, wherein said monitoring client comprises a browser.

10. The method of claim 1, wherein said DBMS comprises one or more database server hosts, wherein said monitoring client is hosted on a computer system different than any of said one or more database server hosts, wherein said DBMS receiving said HTTP request from said monitoring client includes said DBMS receiving said HTTP request from said monitoring client over a network.

11. The method of claim 1, further comprising:
 said DBMS downloading native client-side components to said monitoring client to process said performance monitoring data for presentation on said monitoring client.

12. One or more non-transitory storage media storing a set of instructions which, when executed by one or more computing devices, causes:
 a DBMS receiving an HTTP request from a monitoring client for performance monitoring data related to the DBMS; and
 in response to receiving said HTTP request:
  retrieving performance metrics of the DBMS through a shared database session from a shared pool of sessions of the DBMS;
  based at least in part on the performance metrics, said DBMS generating said performance monitoring data that included: performance information regarding one or more database statements executed by said DBMS, performance information regarding overall system performance of said DBMS, or performance information regarding one or more database sessions of said DBMS; and
  said DBMS transmitting said performance monitoring data to said monitoring client.

13. The one or more non-transitory storage media of claim 12, the set of instructions comprising instructions, which when executed by the one or more computing devices cause:
 in response to receiving said HTTP request, assigning the shared database session from the shared pool of sessions through which to retrieve the performance metrics from native components of the DBMS.

14. The one or more non-transitory storage media of claim 12, wherein generating said performance monitoring data includes generating said performance monitoring data in a presentation-free format.

15. The one or more non-transitory storage media of claim 12, the set of instructions comprising instructions, which when executed by the one or more computing devices cause:
 said DBMS downloading native client-side components to said monitoring client, said native client-side components being configured to decompress data compressed by said DBMS; and
 in response to receiving said HTTP request:
  said DBMS compressing said performance monitoring data.

16. The one or more non-transitory storage media of claim 15, wherein said DBMS downloading native client-side components is performed in response to receiving said HTTP request.

17. The one or more non-transitory storage media of claim 12, the set of instructions comprising instructions, which when executed by the one or more computing devices cause:
 said DBMS downloading native client-side components to said monitoring client, said native client-side components being configured to generate a presentation of particular performance information based on said performance monitoring data.

18. The one or more non-transitory storage media of claim 17, wherein said DBMS downloading the native client-side components is performed in response to receiving said HTTP request.

19. The one or more non-transitory storage media of claim 17, wherein the native client-side components are configured to cause a browser to display the particular information about at least one of:
 the performance information regarding the one or more database sessions of said DBMS,
 the performance information regarding the one or more database statements executed by said DBMS, and
 the performance information regarding overall system performance of said DBMS.

20. The one or more non-transitory storage media of claim 12, wherein said monitoring client comprises a browser.

21. The one or more non-transitory storage media of claim 12, wherein said DBMS comprises one or more database server hosts, wherein said monitoring client is hosted on a computer system different than any of said one or more database server hosts, wherein said DBMS receiving said HTTP request from said monitoring client includes said DBMS receiving said HTTP request from said monitoring client over a network.

* * * * *

UNITED STATES PATENT AND TRADEMARK OFFICE
CERTIFICATE OF CORRECTION

PATENT NO. : 10,218,591 B2  
APPLICATION NO. : 14/312582  
DATED : February 26, 2019  
INVENTOR(S) : Yagoub et al.

Page 1 of 1

It is certified that error appears in the above-identified patent and that said Letters Patent is hereby corrected as shown below:

In the Drawings

On sheet 2 of 4, in FIG. 2A, under Reference Numeral 210, Line 1, delete "RECIEVES" and insert -- RECEIVES --, therefor.

On sheet 3 of 4, in FIG. 2B, under Reference Numeral 245, Line 2, delete "PEFORMANCE" and insert -- PERFORMANCE --, therefor.

In the Claims

In Column 11, Line 39, in Claim 12, delete "included:" and insert -- includes: --, therefor.

Signed and Sealed this  
Fourth Day of February, 2020

Andrei Iancu  
*Director of the United States Patent and Trademark Office*